Jan. 13, 1925.
D. C. MITCHELL, JR
1,523,031
TIDE AND WAVE MOTOR
Filed April 16, 1923
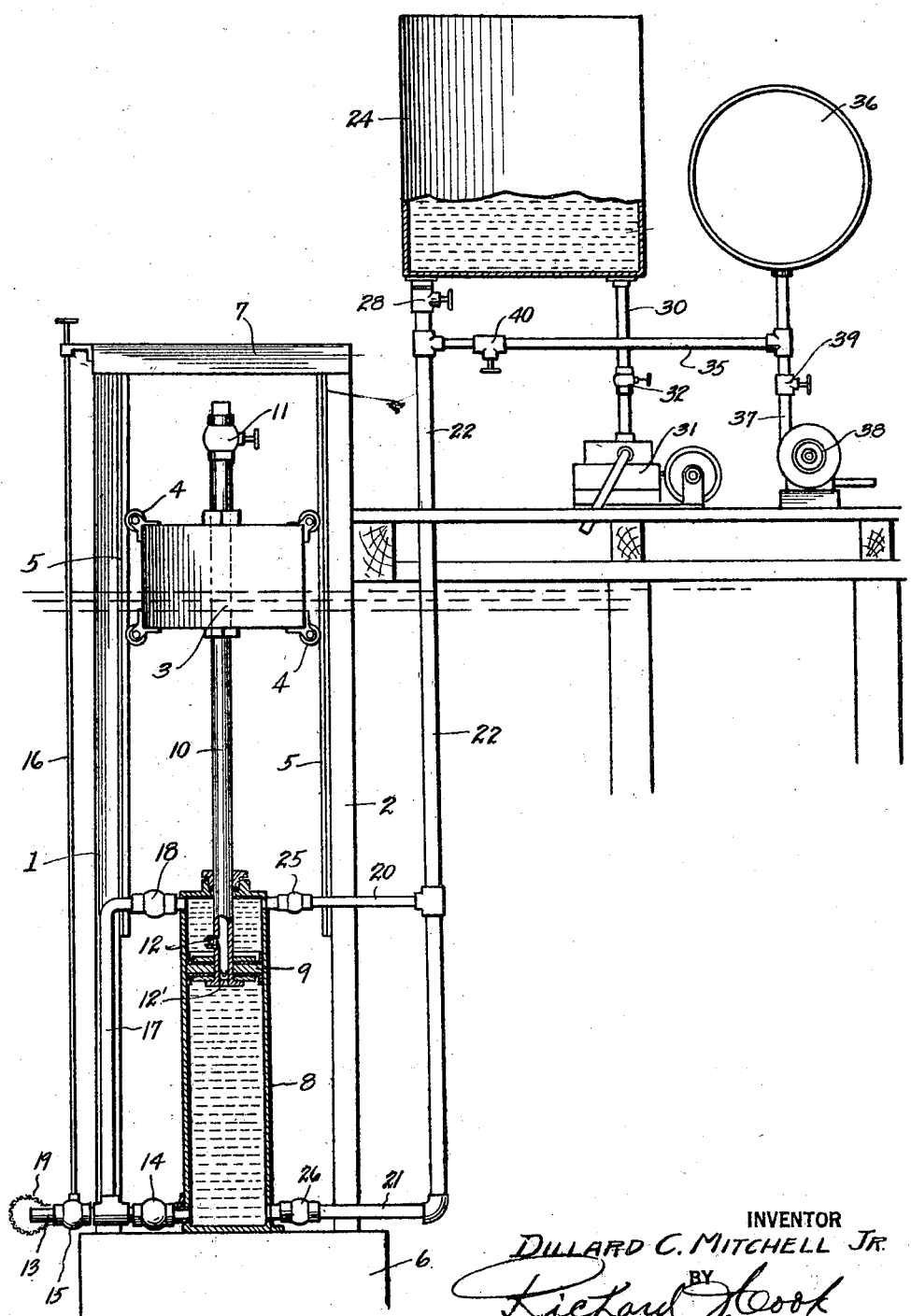
INVENTOR
DILLARD C. MITCHELL JR.
BY
Richard J. Cook
ATTORNEY Patented Jan. 13, 1925.

1,523,031

UNITED STATES PATENT OFFICE.

DILLARD C. MITCHELL, JR., OF SEATTLE, WASHINGTON.

TIDE AND WAVE MOTOR.

Application filed April 16, 1923. Serial No. 632,366.

*To all whom it may concern:*

Be it known that I, DILLARD C. MITCHELL, Jr., a citizen of the United States, and a resident of Seattle, King County, Washington, have invented certain new and useful Improvements in Tide and Wave Motors, of which the following is a specification.

This invention relates to improvements in tide and wave motors and more particularly to a device of that character embodying a float that is adapted to be raised and lowered in accordance with the rise and fall of the tides, or by the action of waves, and which, by its movement, operates a pump mechanism whereby water or air may be stored up under pressure for the operation of an engine, turbine, or the like, which may be used to operate machinery, or to perform other work.

The principal object of the invention resides in the provision of means whereby the pump may be made to store up either water or air and the manner in which either may be used to operate an engine.

Other objects of the invention reside in the details of construction of the various parts embodied in the above device and in the combination and mode of operation as is pointed out in the following description:

In acomplishing the objects of the invention I have provided the improved details of construction, the preferred forms of which are illustrated in the accompanying drawing which shows in elevation, and partly in section, a power generating device constructed in accordance with the present invention.

Referring more in detail to the drawing: 1 and 2, respectively, designate vertical guideways between which a float 3 is mounted to move under the influence of the ocean tides and by the action of waves. It is preferably provided at its ends with rollers 4 that operate along tracks 5 fixed to the inner faces of the guides 1 and 2; the said guides being fixed substantially at their lower ends in a foundation 6 and at their upper ends may be joined by a cross bar 7 forming a cage for the float.

Mounted vertically on the foundation 6, centrally below the float, is a pump cylinder 8 wherein a pump piston 9 is contained and which is connected by a pipe 10 with the float; the pipe being extended upwardly through the float and is provided at its upper end with a valve 11 whereby the pipe may be opened or closed to admit air into the pump cylinder at opposite sides of the piston through back check valves 12 and 12′ through the inner end. Entering the lower end of the cylinder is a pipe 13 through which water may be admitted and this is provided with a back check valve, indicated at 14 which permits the entrance, but prevents any outflow of water through this pipe. A control valve 15 is located at the outer end of pipe 13 and controlled by a rod 16 that extends to the top of the guide frame wherein the float operates. Leading from the pipe 13, at a point between valves 14 and 15 is a pipe 17 that opens into the upper end of the pump cylinder and this is likewise provided with a back check valve 18. The outer end of the pipe 13 is covered with a screen 19 which prevents the entrance of rubbish, or other foreign substances, into the cylinder.

Connected with the lower and upper ends of the cylinder are outlet pipes 20 and 21 that connect with a pipe 22 that enters the lower end of an elevated storage tank 24. Check valves 25 and 26 are located in the pipes 20 and 21 and these operate to prevent any back flow of water from the tank. The pipe 22 is also provided with a valve 28 whereby it may be closed.

From the tank 24 a pipe 30 extends downwardly to an engine 31 which is of a type that may be driven by water delivered thereto under pressure from the tank. The pipe 30 is equipped with a control valve 32 that may be adjusted to vary the amount of water delivered to the engine, and in this way control its speed. If desired, any other type of engine, turbine, or water wheel could be used in place of the one shown.

To provide for the storage of air by means of the pump, I have extended a pipe 35 from the pipe 22 and this connects with an air storage tank 36 and with a pipe 37 that leads to an air motor 38 which may be driven by air delivered under pressure thereto from the tank. A valve 39 in pipe 37 may be adjusted to control the delivery of air to the motor 38 and a valve 40 in pipe 35 may be closed to prevent any outflow of air from the system. With the device so constructed it will operate as follows:

When water is to be stored up, valves 11 and 40 are closed, while valves 15 and 28 are opened, then as the float 3 moves in accordance with the rise or fall of the tides or by the action of waves, the piston moves accordingly and this causes water to be drawn into the cylinder 8 through pipes 13 and 17, and to be forced out through pipes 20 and 21 into the storage tank 24. The engine 31 will operate when valve 32 is opened to admit water thereto, and it may be connected to operate machinery, or to do other work. The amount of power possible to obtain will depend on the elevation of tank 24 above the engine and this should be made as high as it is possible to elevate the water by means of the float. When air is to be used, valves 15 and 28 are closed and valves 11 and 40 are opened. The pump then operates to deliver air into tank 36 and this can be used to drive motor 38 by opening valve 39.

Such a device would be inexpensive to install, and would be very inexpensive to operate. The tanks 24 and 36 could be made sufficiently large that considerable power could be derived therefrom for quite a length of time.

It is apparent also that various details of construction could be changed from without departing from the spirit of the invention and for this reason I do not wish to be limited only to the details herein illustrated.

Having thus described my invention, what I claim as new therein and desire to secure by Letters-Patent is:

A device of the class described, comprising a base, a cage fixedly mounted thereupon, a stationary cylinder mounted upon said base within said cage having valve inlets and outlets upon its upper and lower extremities; said float having pipe connection with said piston, said pipe connection having check valves on its lower end and a valve on its upper end whereby said pipe may be opened or closed to admit a pressure medium on opposite sides of said piston.

Signed at Seattle, King County, Washington, this 9th day of April, 1923.

DILLARD C. MITCHELL, Jr.